United States Patent
Auchmoody et al.

(10) Patent No.: US 9,559,999 B1
(45) Date of Patent: Jan. 31, 2017

(54) METHOD AND SYSTEM FOR PROCESSING LARGE SCALE EMAILS AND LIMITING RESOURCE CONSUMPTION AND INTERRUPTION THEREFROM

(71) Applicant: EMC Corporation, Hopkinton, MA (US)

(72) Inventors: Scott C. Auchmoody, Irvine, CA (US); Frederick Douglis, Basking Ridge, NJ (US); Mark Malamut, Dana Point, CA (US); Vladimir Mandic, San Jose, CA (US); Mark Twomey, Cork (IE); Grant Wallace, Pennington, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 251 days.

(21) Appl. No.: 14/292,714

(22) Filed: May 30, 2014

(51) Int. Cl.
  G06F 15/16 (2006.01)
  H04L 12/58 (2006.01)
  G06Q 10/10 (2012.01)

(52) U.S. Cl.
  CPC .......... *H04L 51/16* (2013.01); *G06Q 10/107* (2013.01); *H04L 12/585* (2013.01); *H04L 12/586* (2013.01)

(58) Field of Classification Search
  CPC .... G06Q 10/107; H04L 12/585; H04L 12/586
  USPC ........................................................ 709/206
  See application file for complete search history.

(56) References Cited

U.S. PATENT DOCUMENTS

| | | | | |
|---|---|---|---|---|
| 5,928,333 A | * | 7/1999 | Landfield | G06Q 10/107 709/245 |
| 2006/0047766 A1 | * | 3/2006 | Spadea | H04L 51/12 709/206 |
| 2007/0043866 A1 | * | 2/2007 | Garbow | G06Q 10/107 709/226 |
| 2007/0277120 A1 | * | 11/2007 | Wilson | G06F 1/1626 715/808 |
| 2007/0294428 A1 | * | 12/2007 | Guy | G06Q 10/107 709/245 |
| 2008/0021962 A1 | * | 1/2008 | Ryan | G06Q 10/107 709/206 |
| 2008/0208988 A1 | * | 8/2008 | Khouri | H04L 12/58 709/206 |
| 2009/0214034 A1 | * | 8/2009 | Mehrotra | G06Q 10/107 380/255 |

(Continued)

OTHER PUBLICATIONS

AbleBits, Check outgoing emails in Outlook, Feb. 17, 2014, https://web.archive.org/web/20140217014740/http://www.ablebits.com/outlook-check-email/index.php.*

*Primary Examiner* — James Conaway
(74) *Attorney, Agent, or Firm* — Blakely, Sokoloff, Taylor & Zafman LLP

(57) ABSTRACT

Techniques for reducing and discouraging sending large scale emails are described herein. According to one embodiment, in response to a first email received from a sender to be sent to a list of recipients, a distribution cost of the first email is determined based on content of the first email and the recipients. An email client application is to present a first graphical user interface (GUI) page to the sender prompting a confirmation from the sender, where the first GUI page includes information indicating a size of the first email and a number of recipients, if the distribution cost of the first email is above a first predetermined threshold. In response to a positive confirmation from the sender, the first email is sent to the intended recipient.

16 Claims, 13 Drawing Sheets

(56) References Cited

U.S. PATENT DOCUMENTS

| | | | |
|---|---|---|---|
| 2009/0259723 A1* | 10/2009 | Roic | G06Q 10/107 709/206 |
| 2009/0307317 A1* | 12/2009 | Essenmacher | G06Q 10/107 709/206 |
| 2010/0030865 A1* | 2/2010 | Jiang | G06Q 10/107 709/207 |
| 2010/0057856 A1* | 3/2010 | O'Sullivan | G06Q 10/107 709/206 |
| 2010/0174784 A1* | 7/2010 | Levey | H04L 51/34 709/206 |
| 2010/0235746 A1* | 9/2010 | Anzures | G06F 3/04855 715/723 |
| 2011/0022664 A1* | 1/2011 | Ainsworth | G06Q 10/107 709/206 |
| 2011/0087741 A1* | 4/2011 | Stern | G06Q 10/107 709/206 |
| 2012/0173644 A1* | 7/2012 | Brown | H04L 12/583 709/206 |
| 2013/0144958 A1* | 6/2013 | St. Jacques, Jr. | G06Q 10/107 709/206 |
| 2015/0326519 A1* | 11/2015 | Bhide | G06F 17/30424 709/206 |

\* cited by examiner

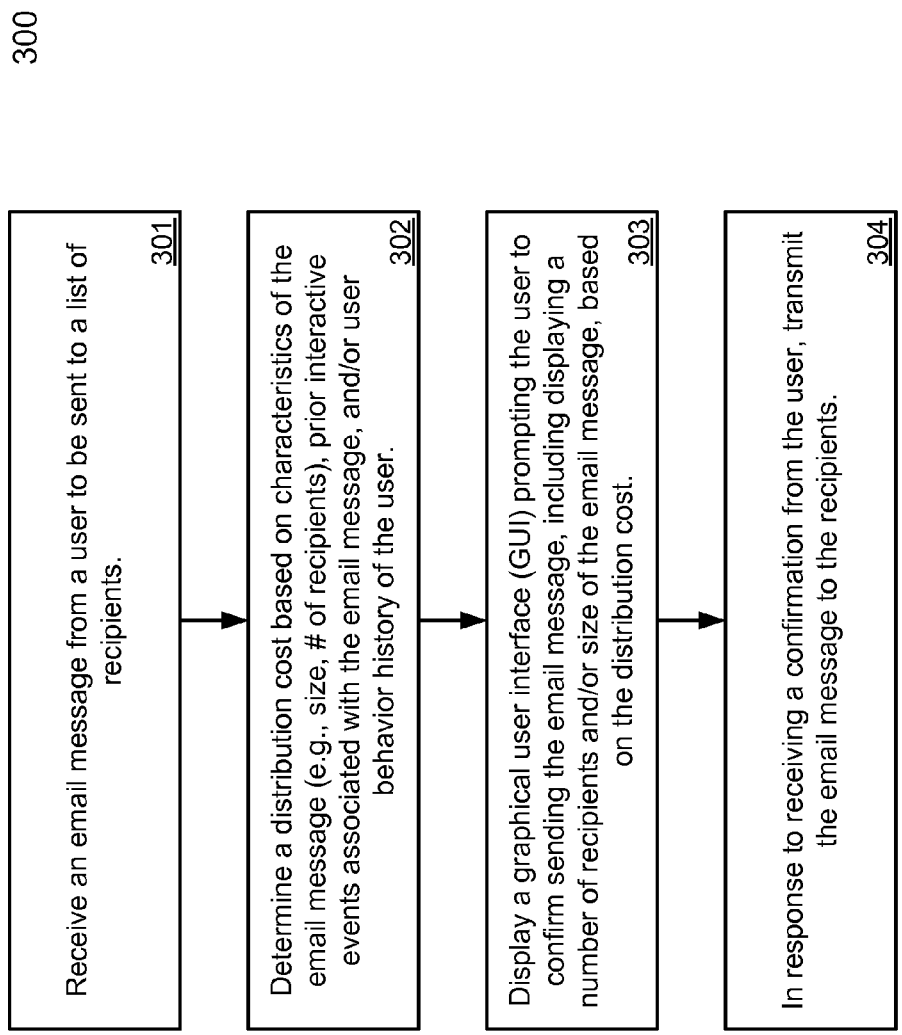

METHOD AND SYSTEM FOR PROCESSING LARGE SCALE EMAILS AND LIMITING RESOURCE CONSUMPTION AND INTERRUPTION THEREFROM

FIELD OF THE INVENTION

Embodiments of the present invention relate generally to electronic mail (email) communications. More particularly, embodiments of the invention relate to reducing and discouraging the sending of large scale emails, which may refer to the frequency, number of recipients and/or size of the emails.

BACKGROUND

Email has become an important method for communicating. Email systems typically include a server component (e.g., Microsoft Exchange™ Server) and a client component (e.g., Microsoft Outlook™ or Microsoft Outlook Express™). These components are typically software applications that are configured to execute on computing devices (e.g., servers, desktops, laptops, and mobile devices). Such email client applications allow users to draft email messages through a user interface and send the messages to recipients. Some email messages may contain files as attachments that are delivered to a recipient along with the message. An email attachment may be any file type including a spreadsheet, a word processing document, or a photograph. One or more files can be attached to a given email message. Attachments can vary in size, typically ranging from a few bytes to twenty-five megabytes.

Typically, an email client allows a user as a sender to send an email with or without an attachment to a list of recipients. Each recipient can respond by replying to the sender individually or alternatively, a recipient can also respond by replying to all of the recipients in the email thread, also referred to as an email conversation, using a reply-all option provided by the email client. Email distribution lists and "reply to all" options are powerful email tools. As has been demonstrated many times, this power sometimes results in people becoming the recipient of unwanted messages. The cost of these unwanted messages includes wasted bandwidth, undesired interruptions, and lost productivity.

For example, someone recently sent a message to a few thousand employees of a large corporation, asking for a particular presentation. Within a few minutes, several people responded with a "reply-all," usually attaching a presentation file or two in the 5-10 MB range. Later someone asked that people not forward large attachments to the entire group; someone followed this up by suggesting some other ways to avoid sending large attachments. After a pause, another person sent the entire list a note pointing out he would not reply-to-all with a presentation, but he still replied to all with the news that he would not send one.

While it was not the worst "reply-all storm" in terms of the number of messages, the product of the per-person data and the number of recipients is huge. It is estimated about 100 GB of traffic was sent in the space of an hour. In addition, each of the thousands of employees was alerted in some fashion about each incoming mail. While reading and deleting the messages is not onerous, some fraction of recipients undoubtedly got an email delivery alert specific to each of these messages. There is a lot of people to interrupt 5-10 times in the space of an hour or two over something which had little to no effect on their work. Further some of the recipients in the email thread may not be interested in receiving further emails on a topic which does not concern them. Such a large scale of email traffic and a large amount of data exchanged over a network can cause an unpleasant experience and unproductive working environment.

Some mail interfaces offer a "mute" or "ignore" option. For example in Gmail™ this means that a message with the same subject goes into "all mail" but bypasses the inbox for a period of time. However such messages cause certain interruption to a user until the user explicitly mutes, and the ignored or muted messages would be sent over the network. A conventional email system includes a feature of displaying a small message indicating a number of recipients of a particular outgoing email. However, such a message is typically displayed briefly and less likely catches a sender's attention. The sender can either ignore it or completely misses the displayed message. The message is displayed only based on the number of recipients and it does not take into the account of the size of the outgoing email.

BRIEF DESCRIPTION OF THE DRAWINGS

Embodiments of the invention are illustrated by way of example and not limitation in the figures of the accompanying drawings in which like references indicate similar elements.

FIG. 3 is a flow diagram illustrating a method for handling large scale emails according to one embodiment of the invention.

DETAILED DESCRIPTION

Figure 1:
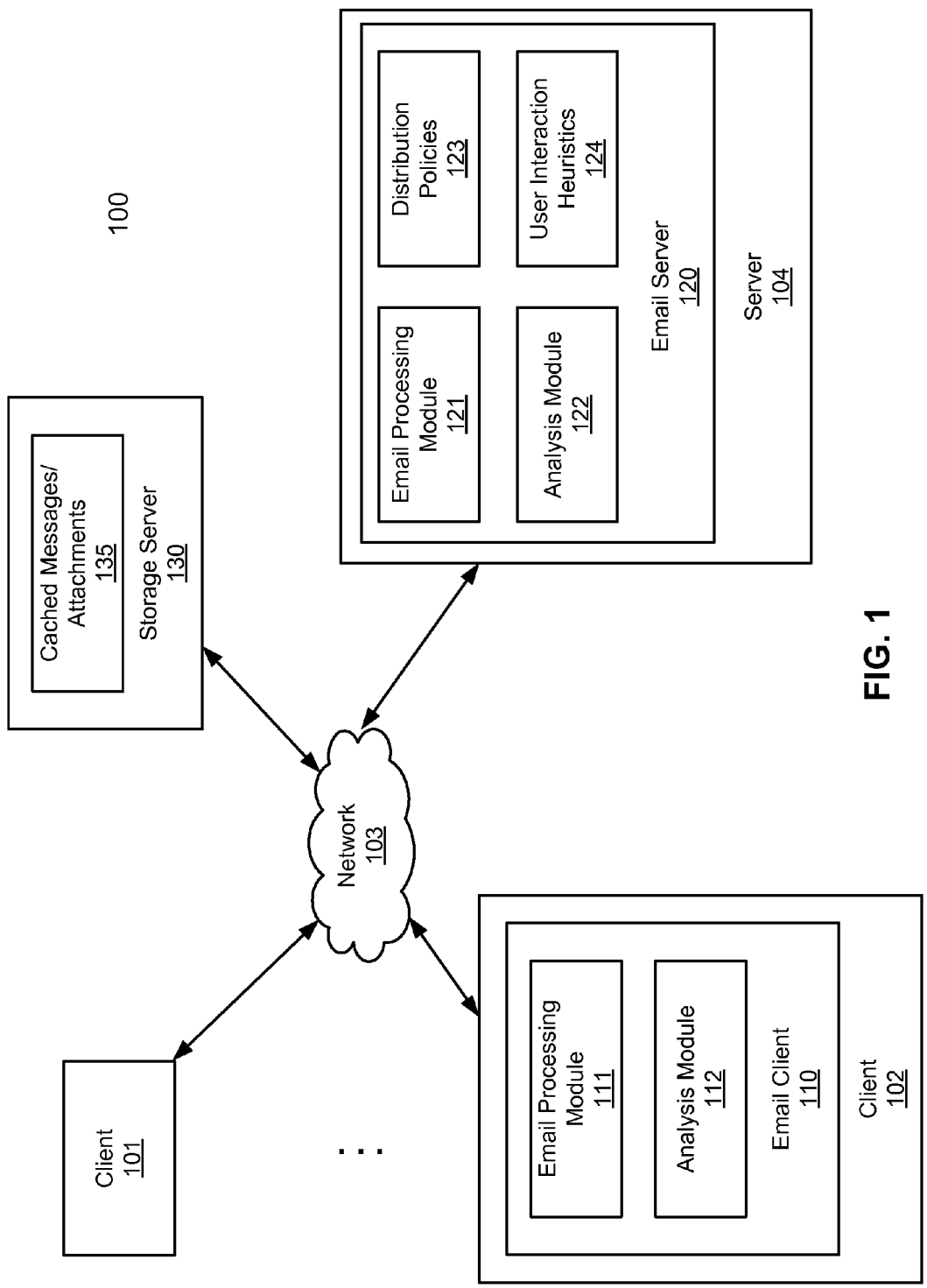
FIG. 1 is a block diagram illustrating an email system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an email distribution system is utilized, either at an email client, an email server, or both, to reduce and/or discourage sending a large scale email (e.g., a large number of recipients and/or a large attachment and/or within a short period of time). In one embodiment, in response to an email to be sent to a list of recipients (e.g., a reply-all email), a distribution cost for distributing such an email is calculated based on a variety of factors or considerations associated with the email, the sender of the email, and/or the recipients of the email.

In one aspect of the invention, if the distribution cost is above a predetermined threshold, prior to distributing the outgoing email, a graphical user interface (GUI), such as a pop-up dialog box or in a Web mail environment, a specific Web page, is automatically displayed prompting the sender to explicitly confirm sending such an email. In addition, the GUI further displays information representing the size of the email and/or the number of recipients that will receive the email. According to another aspect of the invention, based on the distribution cost of sending a particular email, such as a reply-all email, an approval from another user may be required in order for a particular sender to send such an email. According to another aspect of the invention, if a large scale email is indeed being sent to a list of recipients, certain measures or actions are put in place to reduce the network bandwidth and other processing resources required to handle such an email.

According to another aspect of the invention, user interactions or behaviors of recipients with emails associated with an email conversation or thread are monitored and analyzed. Based on the analysis, it is determined whether a particular recipient of the email thread is an active participant or an inactive participant. If it is determined that the recipient is inactive (e.g., disinterested, unimportant, unresponsive), the recipient is given an option or may be automatically converted to receive a digest or summary periodically in lieu of receiving every full email messages (e.g., reply-all emails) of the email thread. The full email messages are archived in a predetermined storage location. As a result of this dynamic conversion to digest mode, users who are less active in an email thread will encounter fewer disruptions and the organization will consume less network resources.

FIG. 1 is a block diagram illustrating a storage system according to one embodiment of the invention. Referring to FIG. 1, system 100 includes, but is not limited to, one or more client systems 101-102 communicatively coupled to server 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as the Internet, or a combination thereof, wired or wireless. Clients 101-102, as a sender and/or a recipient, can exchange emails each other via server 104.

In one embodiment, each of clients 101-102 includes an email client executed therein. For example, for the purpose of illustration, client 102 includes executed therein email client 110 having email processing module 111 and analysis module 112. Email processing module 111 (also referred to as an email user agent) is responsible for sending and receiving emails to and from email server 120 of server 104. Analysis module 112 is configured to monitor and capture user interaction or user behaviors with respect to emails received and sent by email processing module 111. The user interaction or user behaviors may be stored locally or sent to email server 120 to be stored therein in a centralized fashion. Similarly, client 101 may have the same or similar architecture as of client 102. Analysis module 112 may be integrated within email client 110 or alternatively, as a plugin communicative coupled to email client 110 via an application programming interface (API), where the analysis module may be developed by a third-party provider.

Similarly, email server 120 includes email processing module 121, analysis module 122, distribution policies 123, and user interaction heuristics 124. Email processing module 121 may also be referred to as a message transfer agent responsible for routing emails amongst clients 101-102. Analysis module 122, which may also be a plugin or an integrated component, is configured to capture user interaction of users associated with clients 101-102 and compile and store the information as part of user interaction heuristics 124. User interaction heuristics 124 may be subsequently used to determine email distribution policies or rules 123.

An email client, such as email client 110, refers to an application or software component that is used to read, write and send email. In simple terms it is the user interface to the email system. The client usually consists of a combination of a simple text editor, address book, filing cabinet and communications module. The text editor allows for the creation of the message itself, and usually includes simple spell checking and formatting facilities. The ability to allow files or documents to be attached to the message is also available. For example a diagram or schematic could be attached to an email message, offering the recipient the chance to see a project's progress, and comment on it with a reply. The address book allows the users to store commonly used email addresses in an easy to get at format, reducing the chance of addressing errors. The filing cabinet allows for the storage of email messages, both sent and received, and usually gives some form of search function, allowing the easy retrieval of a desired message.

A mail server, such as email server 120, refers to an application or software component that receives email from email clients or other mail servers. It is the workhorse of the email system. A mail server usually consists of a storage area, a set of user definable rules, a list of users and a series of communication modules. The storage area is where mail is stored for local users, and where messages that are in transit to another destination are temporarily stored. It usually takes the form of a simple database of information. The user defined rules determine how the mail server should react when determining the destination of a specific message, or possibly react to the sender of the message. For example: specific email addresses can be barred, or certain users can be restricted to only sending messages within the company. The list of users is a database of user accounts that the mail server recognizes and will deal with locally. The communications modules are the components that actually handle the transfer of messages to and from other mail servers and email clients. Depending upon the requirements of the mail server there may be a number of different modules installed for use.

Email client 110 may be Microsoft Outlook™, Eudora™, or any other well-known email clients. Email server 120 may be any kind of email servers, such as a postal office protocol (POP) mail server, or an Internet message access protocol (IMAP) mail server. Email client 110 and email server 120 may communicate with each other using a variety of mail messaging protocols, such as the simple mail transfer protocol (SMTP). Email server 120 may be proprietary email server, such as a Microsoft Exchange™ server. Alternatively, email server 120 may be a webmail server (e.g., Gmail™, Yahoo Mail™, Hotmail/Outlook™), where a user uses a browser as an email client to access the emails from a Web server as an email server.

According to some embodiments, an analysis module of each of clients 101-102 (e.g., analysis module 112) in conjunction with analysis module 122 of email server 120 is configured to work with each other in an attempt to avoid, reduce, and/or discourage sending large scale emails, to reduce the email processing resource burden for handling such large scale emails, and to reduce the disruption of such a large scale email to the recipients. In one embodiment, in response to an email to be sent to a list of recipients (e.g., a reply-all email), a distribution cost for distributing such an email is calculated, by analysis module 110 and/or analysis module 122, based on a variety of factors or considerations associated with the email, the sender of the email (e.g., email client 110), the recency of other emails, and/or the recipients of the email. For example, the distribution cost may be determined based on the size of the email (including attachments) and/or a number of recipients that will receive such an email. The distribution cost may be determined further based on sender's past interaction or behaviors with respect to an email conversation or email thread associated with the outgoing email in question. The distribution cost may be determined further based on feedbacks or ratings of the sender from other users, collectively referred to as a reputation score of the sender. The distribution cost may be determined further based on how recently or frequently other messages have been sent to the same or similar recipient list. Alternatively, instead of or in addition to adjusting the distribution cost, a threshold may be dynamically adjusted in view of the recent email traffic. The above information is collectively referred to as user interaction heuristics, which may be stored as part of heuristics 124 at email server 120, and some of which may be stored at a local store of client 102. The calculation of the distribution cost may be performed at the client side, the server side, or a combination of both.

In one embodiment of the invention, if the distribution cost is above a predetermined threshold, prior to distributing the outgoing email, a graphical user interface (GUI), such as a pop-up dialog box or in a Web mail environment, a specific Web page, is automatically displayed by email client 110 to prompt the sender to explicitly confirm sending such an email. In addition, the GUI further displays information representing the size of the email and/or the number of recipients that will receive the email. Thus, when the sender of client 102 confirms via the GUI for sending the large scale email, the email is intentionally sent and the sender is well aware of the impact of the email to the email community based on the size of the email and the number of the recipients. In one embodiment, such a confirmation is only required in response to a reply-all outgoing email, for example, after the number of reply-all emails in the same email conversation or email thread exceeds a predetermined threshold (e.g., zero). The confirmation is utilized to discourage the sender from sending a large scale email, particularly a reply-all email, unless it is necessary or indeed intentional.

According to another embodiment of the invention, based on the distribution cost of sending a particular email, such as a reply-all email, an approval from another user may be required in order for a particular sender to send such an email. For example, in response to an outgoing email to be sent to a list of recipients in an email thread, if the distribution cost satisfies a predetermined condition, a GUI is displayed at email client 110 to prompt the sender to provide identifying information (e.g., name or email address) of a second user for approval of sending the email. A specific request for approval is then sent to the second user. Once the approval is received from the second user, the email is sent to the recipients in the list. The sender is notified only if the request is denied. In one embodiment, once the email has been approved to be sent to the recipients, the outgoing email may further identify the approver. Such a mechanism is just another way to further discourage or make sure the sender is aware of sending a large scale email. The rationale behind this mechanism is that a sender and/or an approver may give additional consideration to the result of sending or approving a large scale email.

According to another embodiment of the invention, if a large scale email is indeed being sent to a list of recipients, certain measures or actions are in placed to reduce the network bandwidth and other processing resources required to handle such an email. In one embodiment, in response to a first email to be sent to a list of recipients, the distribution cost of the sending such the first email is determined based on a variety of factors. If the distribution cost satisfies a predetermined condition, at least a portion of the content is extracted from the first email and stored in a predetermined storage location. The first email is then transformed into a second email without the extracted portion of content. Instead, the second email includes a link linking with the predetermined storage location. The second email is then sent to the recipients, where the recipients can access the extracted content from the predetermined storage location via the link within the second email. The predetermined storage location may be accessible or sharable by the recipients. The storage location may be hosted by a third party storage provider and are accessible by all the recipients. According to another embodiment, the email infrastructure may be integrated with an email archiving system (such as SourceOne™) such that the extracted content is presented as a shortcut inside original mail while content is stored as a single-instance in an email archiving system. The extracted content may be an attachment to the first email. As a result, the second email is sent without the attachment or large amount of data associated with it and the required network and processing resources can be greatly reduced. The extracted content may include attachments and/or lengthy text from the body of the first email which subsequently become accessible only from the link supplied in the second email.

According to another embodiment of the invention, user interactions or behaviors of recipients with emails associated with an email conversation or thread are monitored and analyzed. Based on the analysis, it is determined whether a particular recipient of the email thread is an active participant or an inactive participant. If it is determined that the recipient is inactive (e.g., disinterested, ignored, unimportant), the recipient is given an option to receive a digest or summary periodically in lieu of receiving every full email messages (e.g., reply-all emails) of the email thread. The full email messages are archived in a predetermined storage location. Dependent upon the user preference and/or an amount of activities of the email thread, a digest may be delivered to the user periodically, such as daily, weekly, or monthly, etc. The digest includes a brief summary describing each of the emails received during the corresponding period of time. The digest further includes one or more links referencing to the predetermined storage location to allow the user to access the archived full email messages via the links. For example, if there are 100 emails of a particular email thread received by a user during a week and if the user prefers to receive a digest once a week, the user will receive one email having the digest therein instead of receiving 100 emails. As a result, a user who is inactive will not be disrupted by the unwanted emails. Again, some or all of the above operations can be performed at an email client, an email server, or both.

Figure 2A:
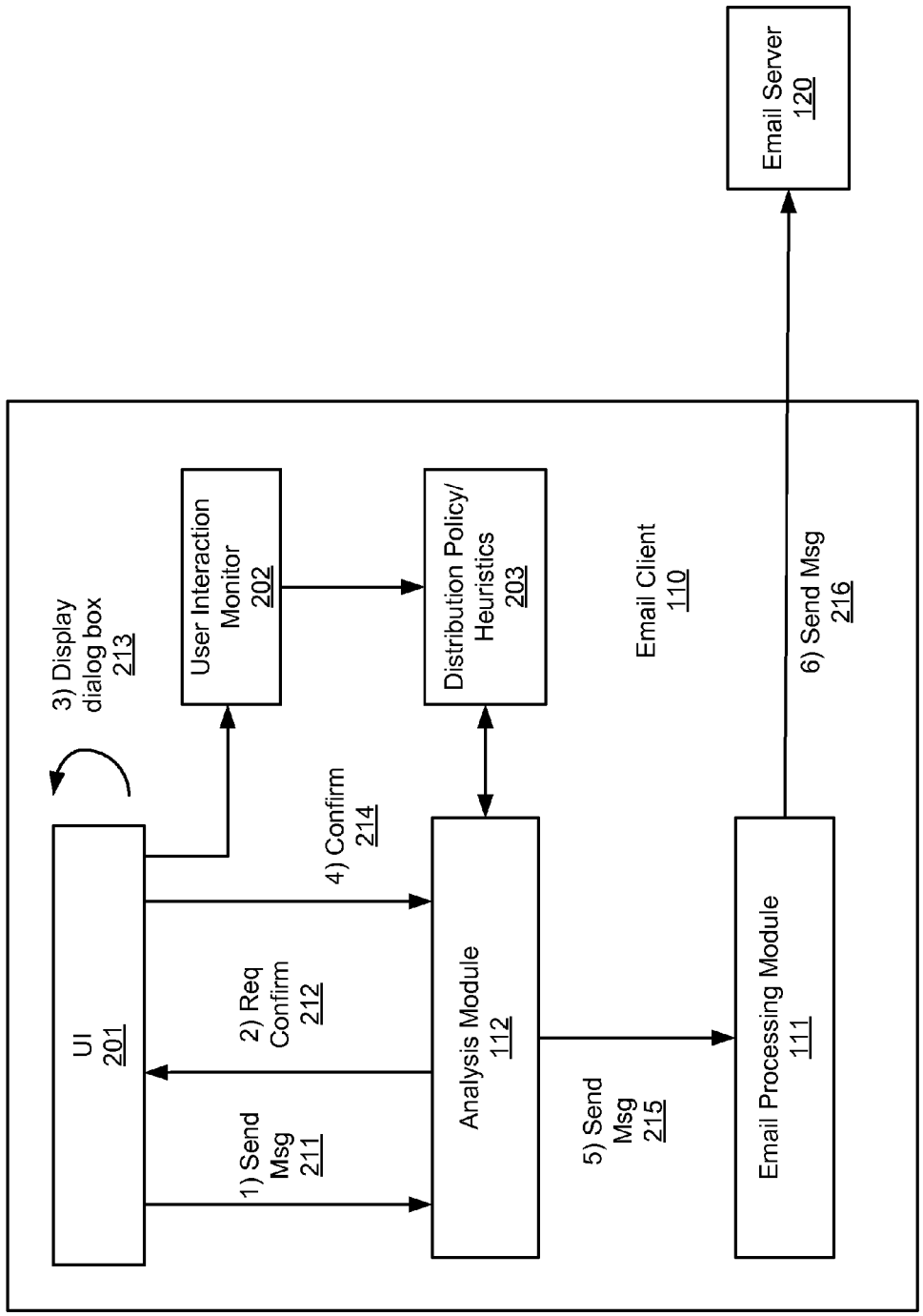
FIGS. 2A and 2B are block diagrams illustrating an email system for handling large scale emails according to one embodiment of the invention.

FIG. 2A is a block diagram illustrating an example of an email system for processing large scale emails according to one embodiment of the invention. Referring to FIG. 2A, in addition to email processing module 111 and analysis module 112, email client 110 includes user interface (UI) 201, user interaction monitor 202, and distribution policy and heuristics 203. UI 201 typically provides a user interface of email system to an end user, such as an email editor to allow a user to prepare, send, and receive an email. User interaction monitor 202 is to monitor and capture the user interaction of the user with respect to the content presented by UI 201. The captured user interaction may be stored in a database and compiled as part of distribution policy or heuristics 203. Note that user interaction module 202 and analysis module 112 may be integrated as a single module. Based on the analysis performed on the captured user interaction or heuristics, user intent or behavior patterns are determined, which may be used to form some of the distribution policy 203 associated with that particular end user. Some of the information stored in database 203 may be transmitted to and/or synchronized with email server 120.

According to one embodiment, in response to an email received via path 211 composed by a sender via UI 201, analysis module 112 determines a distribution cost (also referred to as a weighted recipient list or WRL) based on information retrieved from distribution policy and heuristics 203. As described above, the distribution cost may be determined based on a variety of factors. For example, the distribution cost may be determined based on the size of the outgoing email (including attachments) and/or a number of recipients that will receive such an email. The distribution cost may be determined further based on a sender's past interaction or behaviors with respect to an email conversation or email thread associated with the outgoing email in question, which may be captured by user interaction monitor 202. The distribution cost may be determined further based on feedbacks or ratings of the sender from other users, collectively referred to as a reputation score of the sender. The above information is collectively referred to as user interaction heuristics, which may be stored as part of heuristics at email server 120, and some of which may be stored at a local store, such as database 203 of email client 110.

In one embodiment of the invention, if the distribution cost is above a predetermined threshold, prior to distributing the outgoing email, analysis module 112 causes via path 212 UI 201 to display a graphical user interface (GUI) via path 213, such as a pop-up dialog box or in a Web mail environment, a specific Web page, to prompt the sender to explicitly confirm sending such an email. In addition, the GUI further displays information representing the size of the email and/or the number of recipients that will receive the email. Thus, when the sender confirms from the GUI for sending the large scale email, the email is intentionally sent and the sender is well aware of the impact of the email to the email community based on the size of the email and the number of the recipients. In response to an explicit confirmation received from UI 201 via path 214, the email is sent to email server 120 via paths 215 and 216 to be distributed to the recipients in the list. In one embodiment, the predetermined threshold may be different for different types or classes of senders. The predetermined threshold may be set to different values depending on the sender's role in an organization. For example, a regular employee's threshold may be 25, a director may have a threshold of 100, a vice president may have a threshold of 500. Alternatively, the threshold may be set using a predetermined formula or function based on the number of people reporting to or working for the sender in an organization. For example, the threshold may be ratio*number of reports+constant, i.e. 2.0*number of reports+25.

In one embodiment, such a confirmation is only required in response to a reply-all outgoing email, for example, after the number of reply-all emails in the same email conversation or email thread exceeds a predetermined threshold. The confirmation is utilized to discourage the sender from sending a large scale email, particularly a reply-all email, unless it is necessary or indeed intentional. The GUI presented to the user by UI 201 may be modal dialog box or page that the sender has to either confirm or deny the transmission of the email. According to another embodiment, analysis module 112 also examines the earlier incoming email to which the outgoing email replies is the latest reply-all email in the corresponding email thread. If the outgoing email is not responsive to the latest incoming email, analysis module 112 may cause GUI 201 to display a GUI indicating that the outgoing email is not the one responsive to the latest email in the email thread and prompting the sender to confirm sending the outgoing email.

When a sender composes a reply email, some conventional email systems may flag or indicate that the email being composed is not responsive to the most recent email of the email thread. According to one embodiment, the determination of whether the email to be sent is responsive to the latest email is performed in response to a send command of the email, and an explicit acknowledgement from the sender is required that a newer email has been viewed by the user. Thus, the alert is not triggered until the sender commits sending the reply email.

In some situations, there may be a race situation between receiving and sending out new emails by a particular sender of an email thread. Even if at the time the client contacts the server to send an email there is no recent message in conflict, the server could have another message arrive at approximately the same instant. The email server picks one message to deliver and rejects the other to have the sender confirm it's still timely. But, there can be starvation there if the sender is always a victim of other messages being delivered. According to one embodiment, the server queues the outgoing email but contacts the sender to give the sender a chance to undo (similar to Gmail's undo-after-send feature). If the sender does not undo within a short period of time, the email will be delivered by the server, and in any case no other reply is allowed to go out first once it has "reserved" its spot in the email thread. The rationale behind this approach is that with a wide distribution, it does no one any good to have multiple responses that effectively repeat each other. So, if a client knows of a more recent reply, the user should be aware of that reply before sending more mail, and if the server receives multiple replies it can serialize. According to a further embodiment, even if a reply is in-reply-to a particular message, the header of the outgoing message may be modified to indicate the most recent message seen by the client at the time it was transmitted. This prevents the server from having to guess whether a new message it distributed just before a reply justifies bouncing the reply back for another confirmation, or is already known to the sender.

According to another embodiment, if the number of reply-all emails in the email thread exceed a predetermined threshold (which may be indicated as part of the distribution cost), the transmission of the outgoing email may be deferred for a predetermined period of time, either by email client 110 or email server 120. The deferral of the email effectively provides a cool-down period to the recipients, as some of the recipients may be emotionally replying to incoming email or be unfamiliar with such large volumes of email being distributed to them in such a short space of time. For example, according to one embodiment, the system, either email client 110, email server 120, or both, may detect that a number of emails of an email thread exchanged during a past predetermined period of time exceeds a threshold. In response, the system may reject sending the outgoing email and return a message to sender indicating that the email cannot be sent at the point in time because of excessive activities in the email thread and that the sender can retry later. Alternatively, as described above, the system can queue the email for a period of time before sending it to the recipients. The system may further coalesce email messages that have the same or similar content (e.g., several replies with the same attachment, or several replies of "don't reply to all" messages). The system may also queue and delay a sender's message and later alert the sender if other messages have similar content and request a confirmation from the sender to resend. According to another embodiment, a "velocity" of emails within an email thread is measured. If the velocity of the email thread exceeds a predetermined threshold, an alert is issued to the sender. The velocity of the emails may be measured, for example, using a predefined function, based on a number of email exchanged within a past predetermined period of time and the amount of data carried by the emails.

According to another embodiment, when a large scale email is indeed being sent, for example, after the confirmation from the sender, the email addresses of recipients in the list may be extracted from the TO field and CC field, and inserted into the BCC field. As a result, it makes it harder for a recipient to respond via a reply-all email. In addition, according to a particular embodiment, information identifying the recipients (e.g., names or email addresses) may be inserted into the body of the outgoing email, such that the recipients are aware who receives the email.

Figure 2B:
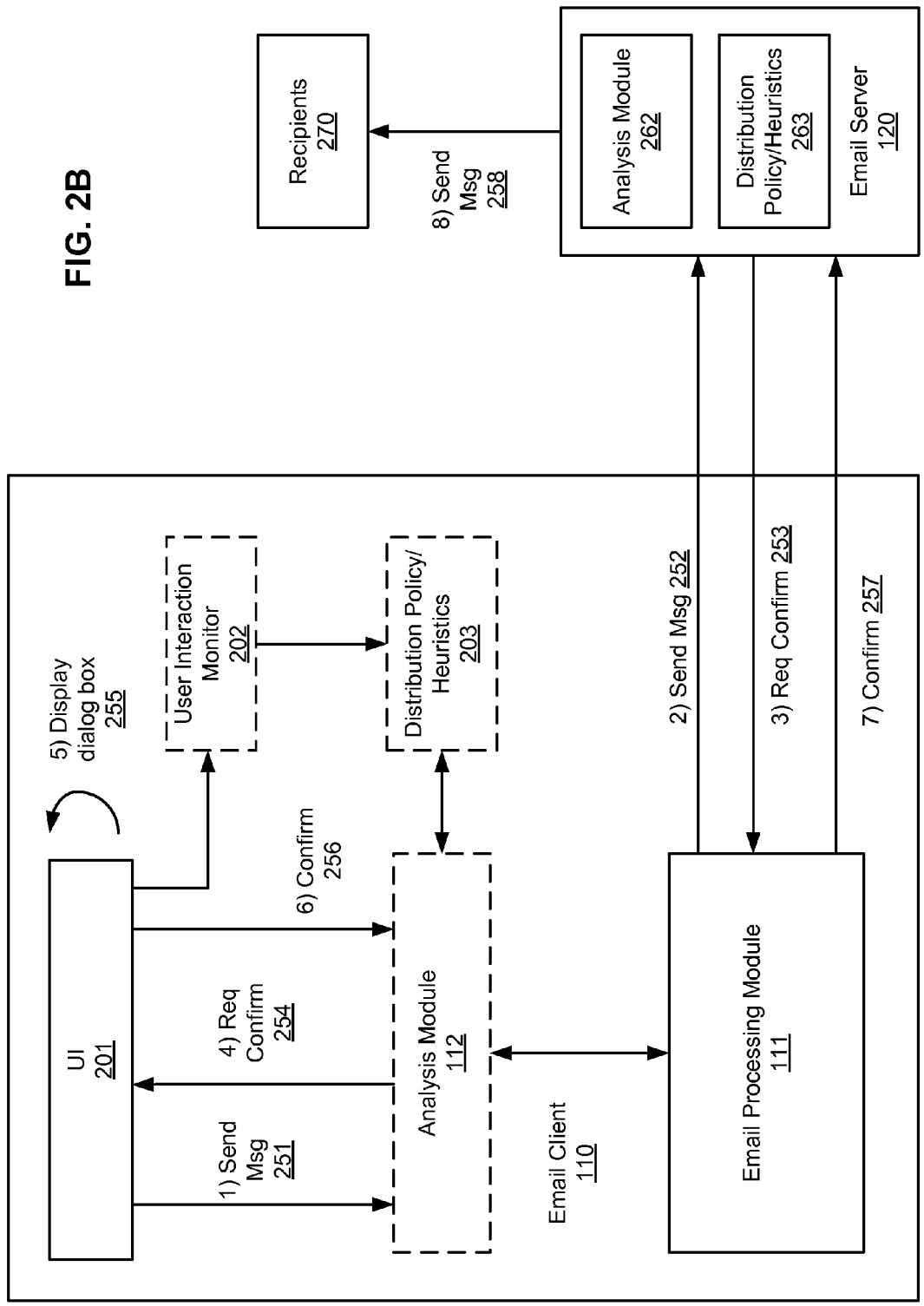

Note that the operations described above can be performed at an email client side or alternatively, they can also be performed at an email server side as shown in FIG. 2B. Referring to FIG. 2B, when an outgoing email (e.g., reply-all email) is received via path 251 to be sent to recipients 270, email processing module 111 simply forwards the email to email server 120 via path 252. At email server 120, analysis module 262 performs actions similar those performed by analysis module 112 at the client side as described above based on information stored in database 263, which stores information similar to those stored in database 203 as described above. When the distribution cost satisfies a predetermined condition, email server 120 transmits a request for confirmation via path 253, which is forwarded to UI 201 via path 254. In response, UI 201 displays a GUI via path 255 to prompt the sender to explicitly confirm the transmission of the email. When the confirmation is received from UI 201 via path 256, the confirmation is forwarded to email server 120 via path 257. In response to the confirmation, email server 120 sends the email to recipients 270 via path 258. In this embodiment, email server 120 further performs other large scale email management functions as described above with respect to FIG. 2A.

FIG. 3 is a flow diagram illustrating a method for processing large scale emails according to one embodiment of the invention. Method 300 may be performed by processing logic which may include software, hardware, or a combination thereof. For example, method 300 may be performed by email client 110 and/or email server 120 of FIGS. 2A and 2B. Referring to FIG. 3, at block 301, processing logic (e.g., email client) receives an email message from a user to be sent to a list of recipients. At block 302, a distribution cost of the email is determined based on characteristics of the email and/or user past behaviors. If the distribution cost satisfies a predetermined condition, at block 303, a GUI is displayed prompting the user to confirm sending such an email. The GUI may further include the size of the email and the number of recipients who will receive the email. In response to a positive confirmation from the user, at block 304, the email is then sent to the recipients.

Figure 4A:
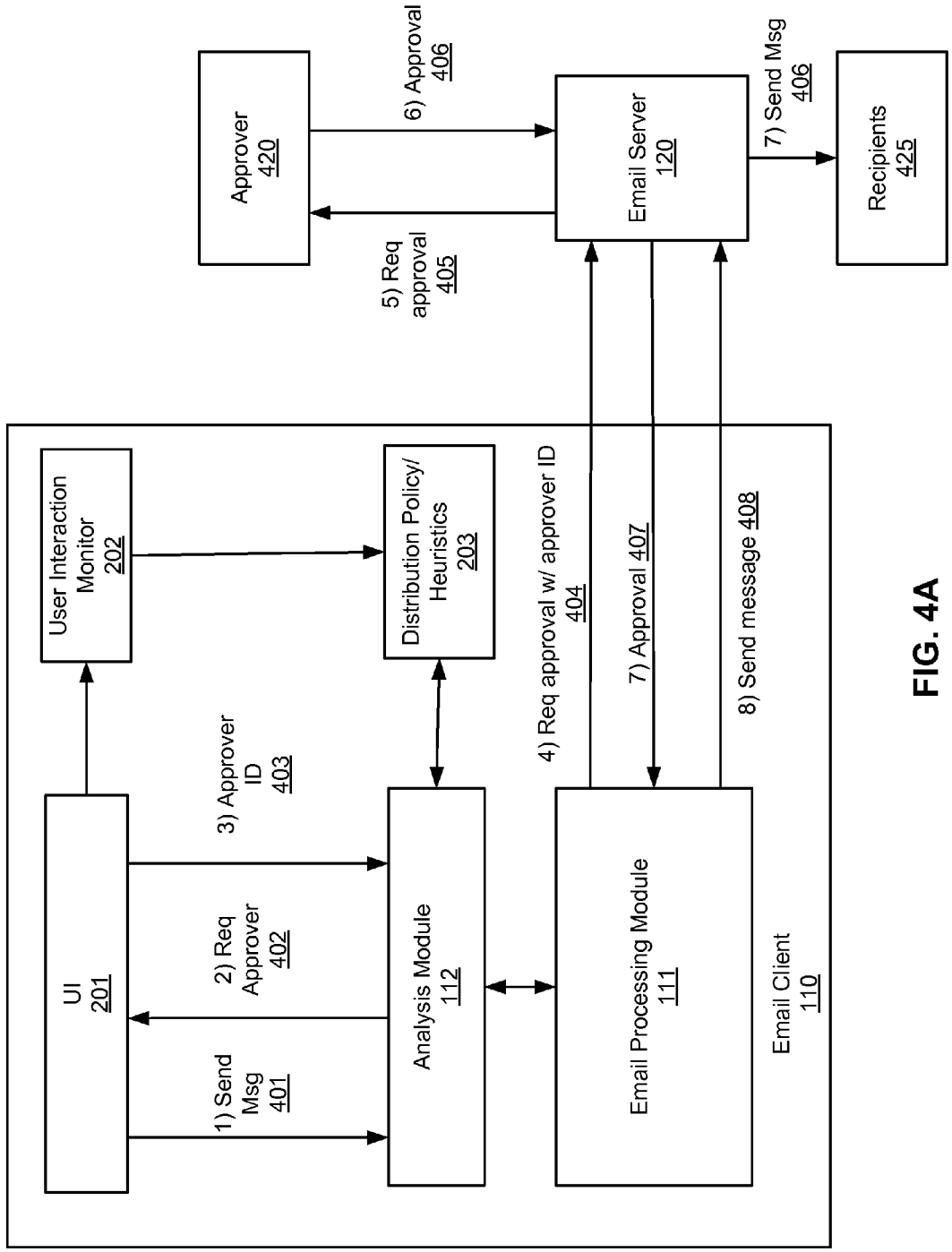
FIGS. 4A and 4B are block diagrams illustrating an email system for handling large scale emails according to another embodiment of the invention.
Figure 4B:
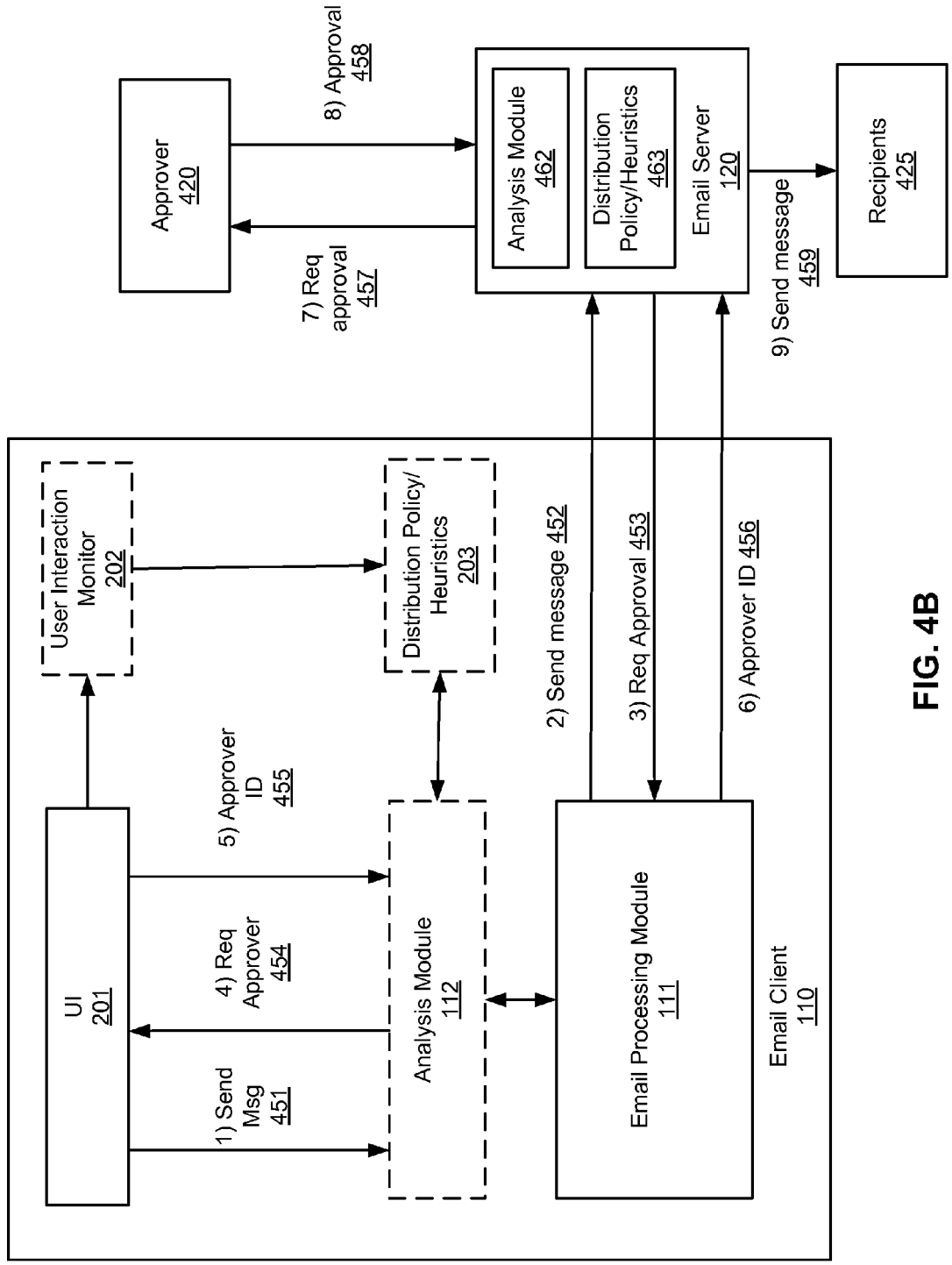

According to another embodiment, in addition to displaying a GUI for confirmation of sending a large scale email, an approval from a second user may be required, dependent upon the specific configuration and/or the associated distribution cost. FIGS. 4A and 4B are block diagrams illustrating an email system according to another embodiment of the invention. Referring to FIG. 4A, some of the components of email client 110, such as GUI 201, analysis modules 112, user interaction monitor 202, distribution policy and heuristics 203, and email processing module 111, have the same or similar functionalities of the counterpart components in FIGS. 2A and 2B.

According to one embodiment, in response to an email received via path 401 composed by a sender via UI 201, analysis module 112 determines a distribution cost based on information retrieved from distribution policy and heuristics 203. As described above, the distribution cost may be determined based on a variety of factors. For example, the distribution cost may be determined based on the size of the outgoing email (including attachments) and/or a number of recipients that will receive such an email. The distribution cost may be determined further based on sender's past interaction or behaviors with respect to an email conversation or email thread associated with the outgoing email in question, which may be captured by user interaction monitor 202. The distribution cost may be determined further based on feedback or ratings of the sender from other users, collectively referred to as a reputation score of the sender. For instance, a recipient who "mutes" a topic is voting against messages on that topic being distributed, so that could make it more likely to reject or require extra approvals. This extra burden on future messages can apply to the topic, the senders, or both. Alternatively, users could explicitly "report" a message to give negative feedback about the sender to be used for evaluating future emails. A preponderance of negative feedback can be used to set the threshold for a particular user such that future large-scale mailings would be disallowed, delayed, or dependent upon explicit approvals. The above information is collectively referred to as user interaction heuristics, which may be stored as part of heuristics at email server 120, and some of which may be stored at a local store, such as, database 203, of email client 110. The user interaction heuristics may be time-based, meaning that a user's "rating" fluctuates toward the average over time in the absence of further explicit updates to the information. For example, a user might require additional approvals for a period of time, then regain access to email directly. Additional negative feedback might increase the time during which the user is "on probation" or make the restrictions permanent.

If the distribution cost satisfies a predetermined condition, analysis module 112 sends a request for approver to UI 201 via path 402. In response, UI 201 displays a GUI requesting the sender to provide an approver in order to send such an email. Once the sender provides the requested approver, UI 201 forwards the identifying information of an approver (e.g., name, email address) to analysis module 112 via path 403. Analysis module 112 then sends an email to the approver, in this example, approver 420, via path 404 and forwarded by email server 120 via path 405 for approval of sending the email. Once the approval is received from approver 420 via path 406, email server 120 transmits the approval via path 407 back to email client 110. In response to the approval received from email server 120, the email is then sent to email server via path 408 and distributed by email server 120 to recipients 425 via path 407.

According to one embodiment, approver 420 may be any person selected by the sender of the email. Particularly, approver 420 may be any user within the same organization of the sender selected by the sender. Alternatively, approver 420 may be a designated person within the organization having the specific authorization for approving sending large scale emails. For example, approver 420 may be a manager or supervisor of the sender. According to another embodiment, the approved email being sent to recipients 425 further includes information identifying approver 420 who has approved the outgoing email. As a result, when sending a large scale email, since another user is required to approve, the sender may think twice before indeed sending the email. Similarly, approver 420 may also put in additional consideration before approving the email, especially because their identity may be included in the email. As a result, such a mechanism may further discourage users from sending large scale emails.

The above management actions are mainly performed at the email client side. The same or majority of the actions described above may also be performed at the email server side as shown in FIG. 4B. Referring to FIG. 4B, in response to an email received from UI 201 via path 451, email processing module 111 forwards the email to email server 120 via path 452. Similar to analysis module 112 in FIG. 4A, analysis module 462 determines a distribution cost of sending the received email based on information provided by distribution policy and heuristics 463 as described above. If the distribution cost satisfies a predetermined condition, email server 120 responds with a request for an approver from another user via path 453. The request for the approver is forwarded back to UI 201 via path 454.

In response to the request for an approver, UI 201 displays a GUI prompting the sender to provider identifying information of an approver. The approver ID is then received by email processing module 111 via path 455 and forwarded to email server 120 via path 456. Based on the approver ID, email server 120 looks up the email address of the approver, for example, using a directory service, and sends a request for approval to approver 420 via path 457. In response to an approval received from approver 420 via path 458, email server 120 then distributes the email to the intended recipients 425 via path 459. In this example, the sender has an option to select an approver of his/her choice.

Alternatively, according to another embodiment, email server 120 can automatically identify and select one of the designated approvers in a pool, which has been previously configured and stored in a database associated with email server. For example, certain people with certain roles of an organization may be authorized to approve sending large scale emails. In this example, the sender may not know who approved the email if the email has indeed been sent. However, if the email is disapproved for sending, the sender may be notified by the system, optionally including an approver who disapproved the email. As described above, the email being sent may further include, for example, in the header or body of the email, identifying information identifying the corresponding approver.

According to another embodiment, it could be automated similar to mailing list signups: reply with a note containing a nonce, asking that another person reply with that nonce to state it is "seconded." When the email is sent, it gets a header saying "This message was sent to N people by John Doe, approved by Mary Smith." In another embodiment, instead of pop-up warnings, an email could be bounced back from the server to the sender requesting explicit acknowledgment, for instance of corporate practices regarding email. Specific pre-approved senders would be exempt from this extra check. In another embodiment, the system can distinguish between sending an initial message to many recipients and replying to many recipients, placing extra barriers such as pop-up notices or bouncing a message and requiring explicit confirmation, only when one is replying. In another embodiment, the determination of what is appropriate could be managed via a rating system: once people have built up goodwill via past exchanges, or based on their position in an organization, the need for a second approver could be bypassed or the threshold increased.

According to one embodiment, in order to simplify the decision making process, emails of an email thread may be tagged with different categories. Examples of the categories may include a restricted class, a rate-limit class, a peer-approval class, and an open class. A restricted email can be sent by an approved sender (e.g., employees of an organization). A rate-limit email can be sent up to a predetermined number within a short period of time. A peer-approval email requires a peer's approval before sending it to the recipients. An open email has no restriction. Based on the tags, it is easier for the email client and/or email server to decide what management action should be taken.

Figure 5:
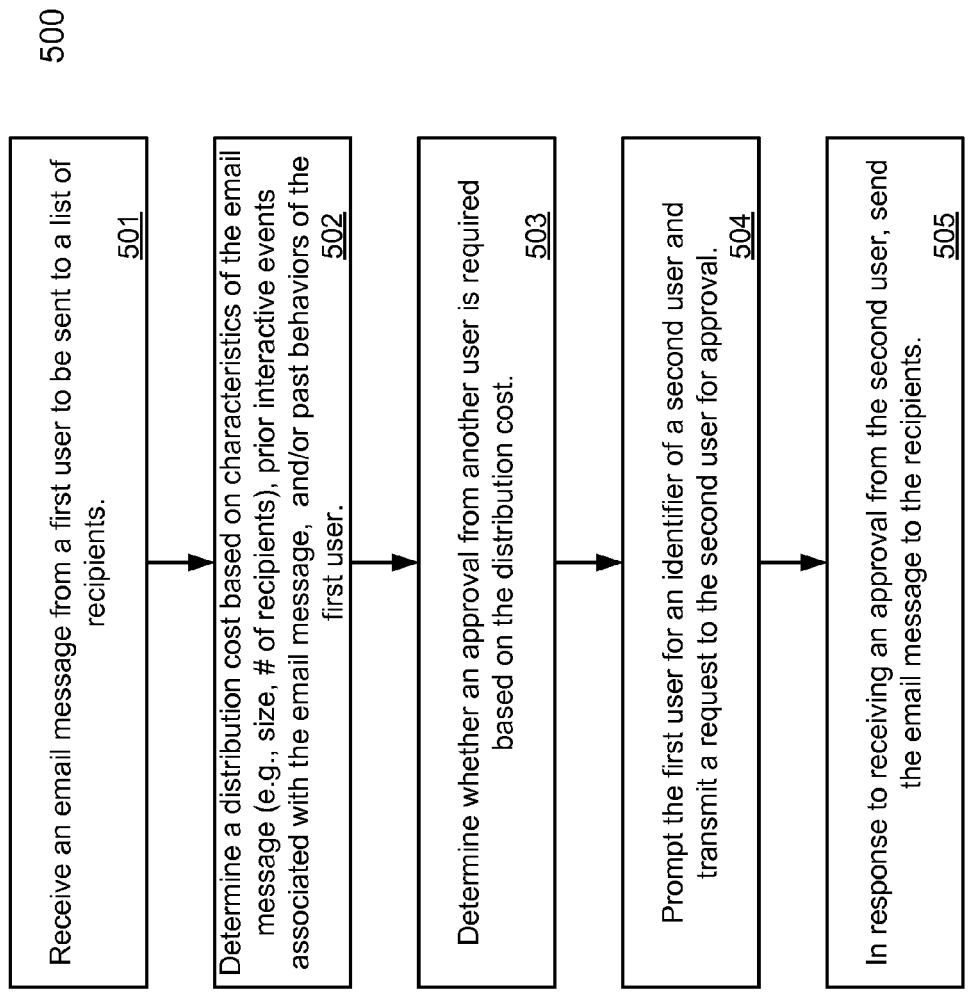
FIG. 5 is a flow diagram illustrating a method for handling large scale emails according another embodiment of the invention.

FIG. 5 is a flow diagram illustrating a method for handling large scale emails according to another embodiment of the invention. Method 500 may be performed by processing logic which may include software, hardware, or a combination thereof. For example, method 500 may be performed by email client 110 and/or email server 120 of FIGS. 4A and 4B. Referring to FIG. 5, at block 501, processing logic receives an email message from a sender to be distributed to a list of recipients. At block 502, processing logic determines a distribution cost based on characteristics of the email message (e.g., size, number of recipients) and/or past user behaviors of the sender. At block 503, based on the distribution cost of the email, processing logic determines whether an approval from another user is required. If so, at block 504, processing logic prompts or causes an email client to prompt the sender for an identifier of a second user, and transmits a request for approval to the second user.

Alternatively, the processing logic can automatically identify the approver without user intervention. In response to receiving approval from the second user, at block 505, the email is then sent to the intended recipients, optionally including identifying information of the second user.

The techniques described above are designed to reduce and discourage sending large scale emails. However, according to another embodiment of the invention, if a large scale email is indeed being sent to a list of recipients, for example, after receiving the positive confirmation from the sender and/or an approval from another user, further optimization actions are performed to reduce the network bandwidth and other processing resources required to handle such a large scale email. In one embodiment, in response to a first email to be sent to a list of recipients, the distribution cost of the sending such the first email is determined based on a variety of factors. If the distribution cost satisfies a predetermined condition, at least a portion of the content is extracted from the first email and stored in a predetermined storage location. The first email is then transformed into a second email without the extracted portion of content. Instead, the second email includes a link linking with the predetermined storage location. The second email is then sent to the recipients, where the recipients can access the extracted content from the predetermined storage location via the link within the second email. The predetermined storage location may be accessible or sharable by the recipients. The storage location may be hosted by a third party storage provider in which the recipients have privilege to access. The extracted content may be an attachment to the first email. As a result, the second email is sent without the attachment or large amount of data associated with it and the required network and processing resources can be greatly reduced.

Figure 6A:
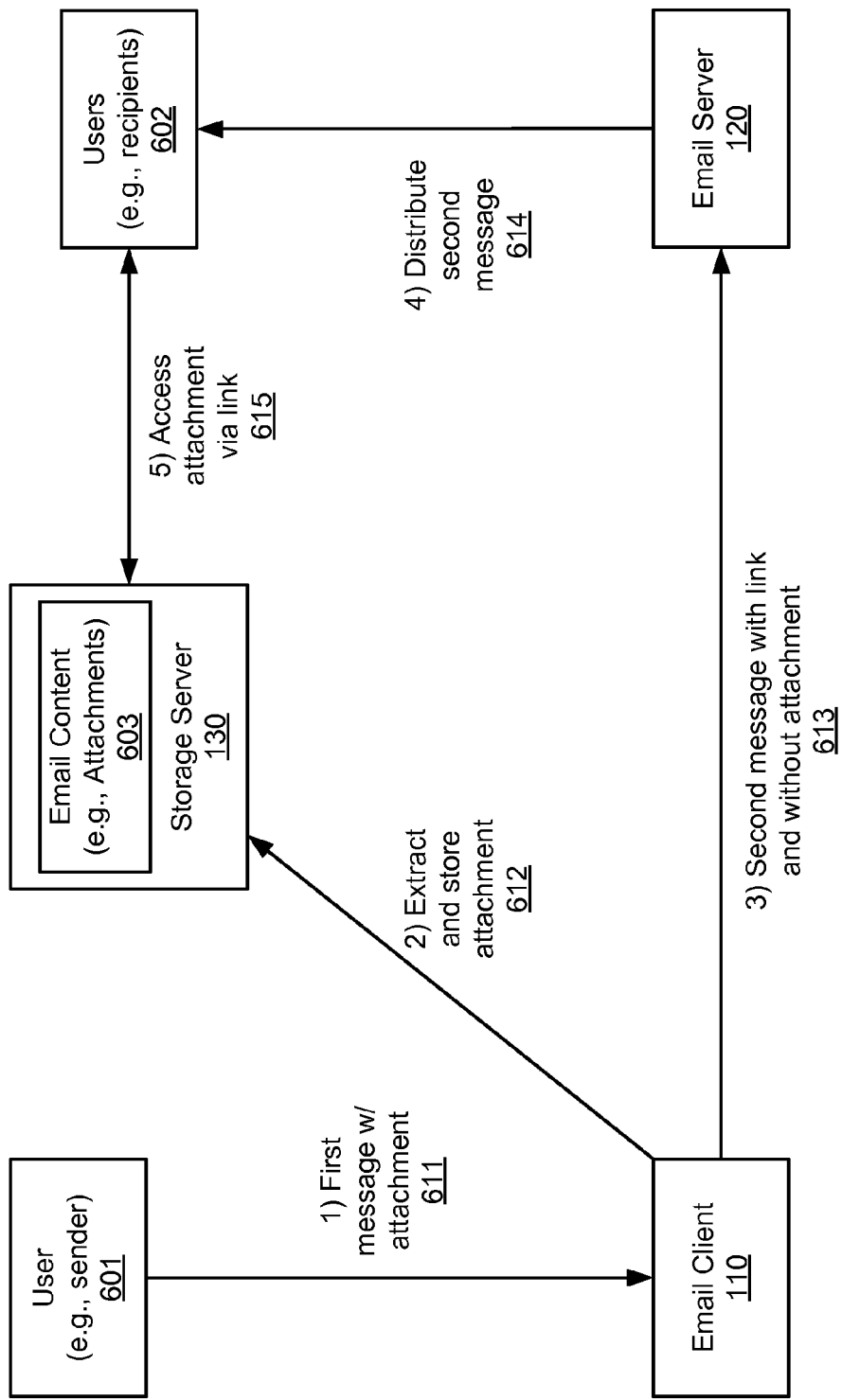
FIGS. 6A and 6B are block diagrams illustrating an email system for handling large scale emails according to another embodiment of the invention.

FIG. 6A is a block diagram illustrating an email system for handling large scale emails according to another embodiment of the invention. Referring to FIG. 6A, in response to a first email received from sender 601 via path 611, email client 110 determines a distribution cost of sending such an email as described above. If the distribution cost satisfies a predetermined condition, client 110 automatically extracts at least a portion of content (e.g., attachment) of the first email and stores the extracted content of the first email in a predetermined storage location, in this example, as part of email content 603 of storage server 130 via path 612. As described above, the distribution cost may be calculated or determined based on a combination of a size of the first email and the number of the recipients who will receive the first email. The extracted content could be an attachment to an email or just the actual content of a large email.

In addition, email client 110 transforms the first email into a second email that is without the content extracted from the first email and embeds a link within the second email that references to the predetermined storage location at storage server 130. The second email is then sent to email server 120 via path 613, which distributes the second email to recipients 602 via path 614. From the link of the second email, recipients 602 can access the extracted content 603 via path 615. Thus, the email traffic involved in paths 613 and 614 will not have to carry the large amount of content that is originally part of the first email. As a result, the network bandwidth and other processing resources required to handle such an email can be reduced, as can storage consumption on the client computers. Note that the predetermined storage location has to be accessible to all of the recipients. Storage server 130 may be hosted by a designated server within an organization or alternatively, it can be provided by a third-party storage provider. In one embodiment, the optimization operations may be performed only to the reply-all email messages of an email thread. Alternatively, the optimization operations may be performed only when the number of emails in the email thread exceeds a predetermined threshold. Furthermore, the optimization operations may be performed based on user configuration or settings. The extracted content stored at storage server 130 may be periodically scanned and removed (e.g., garbage collection), for example, if all referenced emails have been deleted by the end users, assuming communications are established between storage server 130 and email server 120 concerning the references of emails to the stored content 603.

If the archived emails are associated with a single administrative domain (e.g., same corporate domain) then the garbage collection software can reference count or mark and sweep to identify when an attachment is no longer live. For Web mails, there may be a need to establish a standard by which different mail servers can notify a repository that a message referencing an attachment has been removed. Some storage servers may remove content stored therein after a period of time. In one embodiment, the message body and the attachment(s) of an email are teased apart. If a user gets the body, he or she may find it irrelevant and delete without retrieving the attachments, or he or she may retrieve the attachments. Doing so reconstitutes the message on the receiver's machine. After a predetermined number of days, the attachments disappear.

Figure 6B:
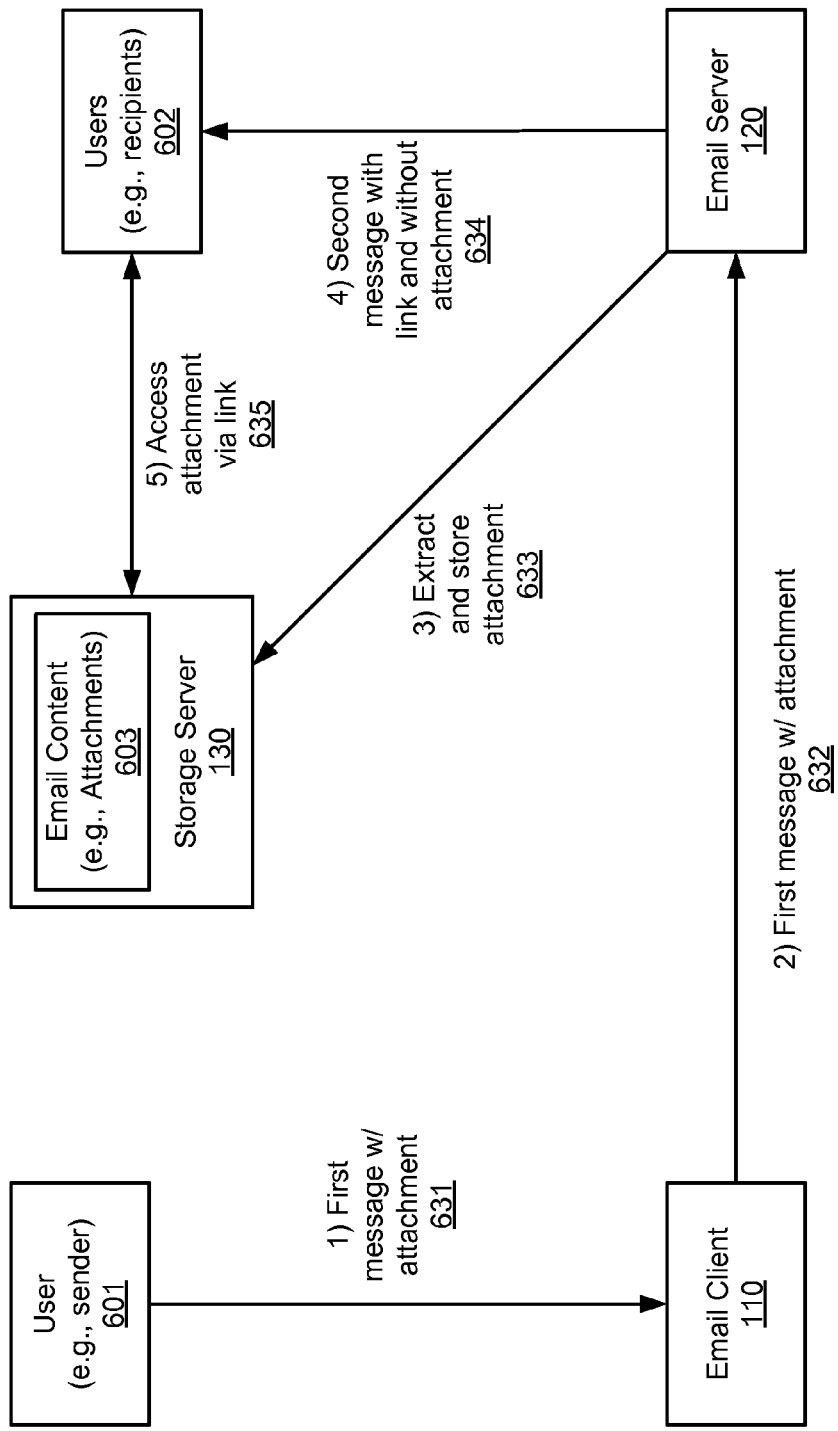

The above optimization operations are mainly performed at the email client. Alternatively, the optimization operations can also be performed at the email server as shown in FIG. 6B. Referring to FIG. 6B, in response to a first email received from sender 601 via path 631, email client 110 simply forwards the first the email to email server 120 via path 632. Email server 120 determines the distribution cost of sending the first email as described above. If the distribution cost satisfies a predetermined condition, email server 120 automatically extracts at least a portion of content of the first email and stores in a predetermined storage location, for example, as part of content 603 of storage server 130 via path 633. Email server 120 then transforms the first email into a second email that is without the extracted content. The second email includes a link (e.g., universal resource locator or URL) referencing the predetermined storage location. The second email is then distributed to the intended recipients via path 634. From the link of the second email, recipients 602 can access the extracted content via path 635.

Figure 7:
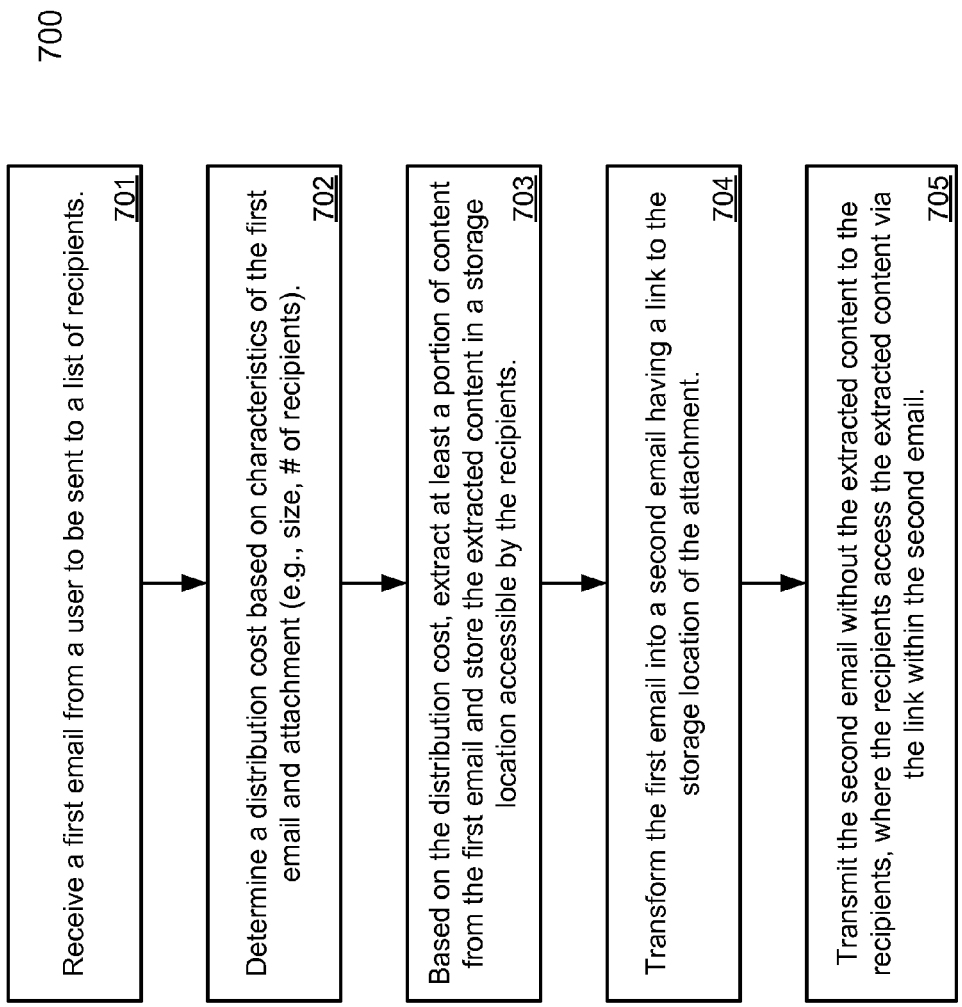
FIG. 7 is a flow diagram illustrating a method for handling large scale emails according another embodiment of the invention.

FIG. 7 is a flow diagram illustrating a method for handling large scale emails according to another embodiment of the invention. Method 700 may be performed by processing logic which may include software, hardware, or a combination thereof. For example, method 700 may be performed by email systems as shown in FIGS. 6A-6B. Referring to FIG. 7, at block 701, processing logic receives a first email from a sender to be distributed to a list of recipients. At block 702, processing logic determines a distribution cost of sending the first email based on a variety of factors, such as, for example, the size of the first email, a number of recipients, and sender's past behaviors, etc., as described above. At block 703, if the distribution cost satisfies a predetermined condition, processing logic extracts at least a portion of content of the first email and stores the extracted content in a predetermined storage location accessible by the recipients. At block 704, processing logic transforms the first email into a second email without the extracted content, where the second email includes a link linking with the predetermined storage location. At block 705, the second email is sent to the recipients without the extracted content, such that the recipients can access the extracted content from the predetermined storage location via the link within the second email. Thereafter, periodically a garbage collection process may be performed at the storage location to remove any content that is not referenced by any email (e.g., deleted emails).

According to another embodiment, certain recipients who are not active participants in the subject or topic associated with the email thread may be dynamically enabled to opt out of continuously receiving every incoming emails of the email thread. Instead, such inactive recipients may receive a digest or summary describing the emails that are supposed to received by the recipients during a period of time. The digest or summary may be periodically delivered according to a digest delivery schedule, which may be user configurable or automatically determined by the email system dependent upon the amount of traffic of the email thread. Such an arrangement can further reduce the email traffic across the network.

Figure 8:
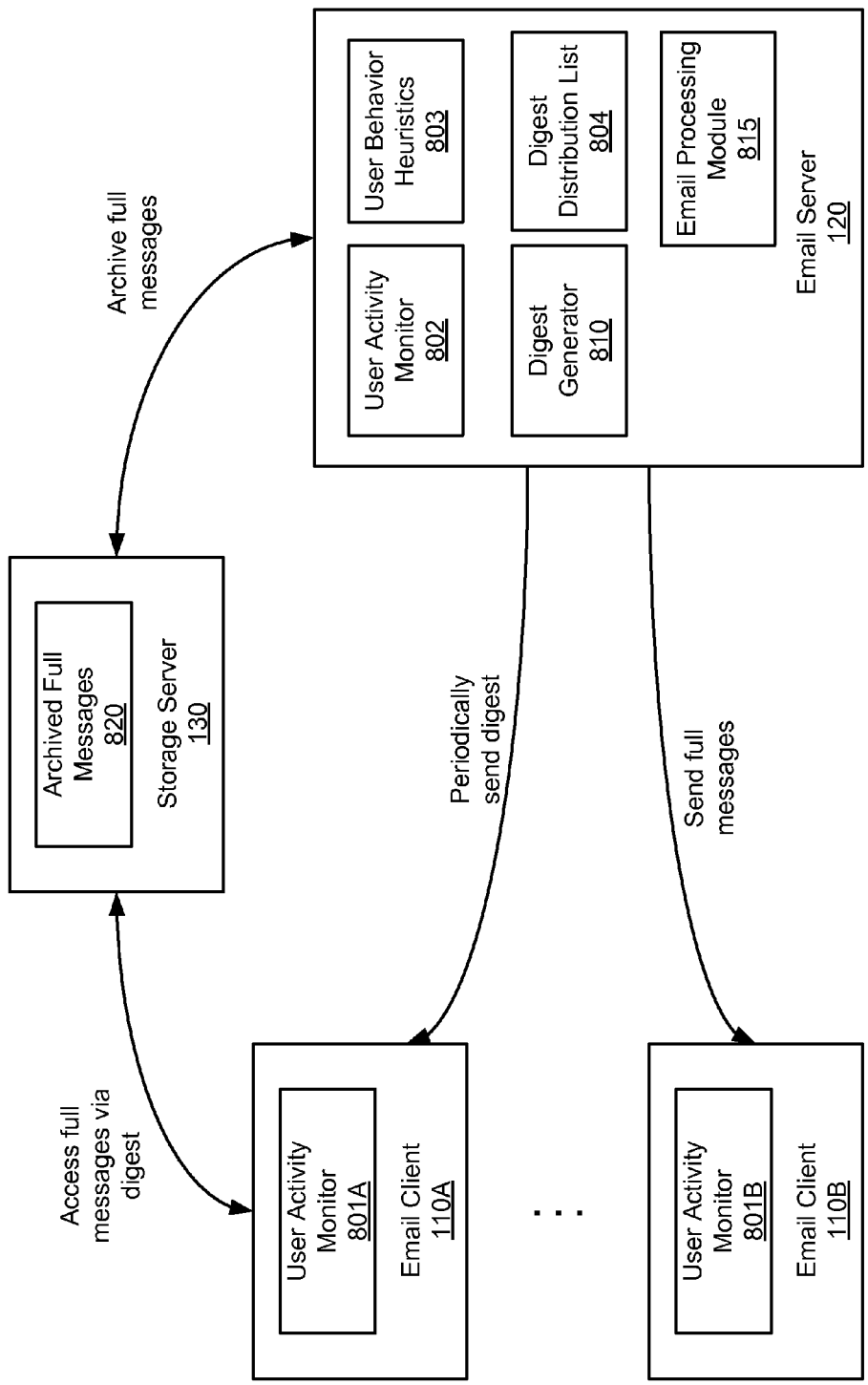
FIG. 8 is a flow diagram illustrating a method for handling large scale emails according another embodiment of the invention.

FIG. 8 is a block diagram illustrating an example of an email system handling large scale emails according to another embodiment of the invention. Referring to FIG. 8, in one embodiment, user interactions or behaviors of recipients, such as users represented by email clients 110A-110B, with emails associated with an email conversation or thread are monitored and analyzed, for example, by user activity monitors 801A-801B at email clients 110A-110B, respectively. The user interaction with the emails may also be monitored and analyzed by user activity monitor 802 at email server 120. The analyzed data may be compiled as part of user behavior heuristics 803. Monitors 801A-801B at the client sides and monitor 802 at the server side may communicate with each other to synchronize the user interaction information, which forms the basis of user behavior heuristics 803.

Based on the analysis, the system (e.g., client, server, or both) determines whether a particular recipient of the email thread is an active participant or an inactive participant. If it is determined that the recipient is inactive (e.g., disinterested, unimportant based on the user actions with the received emails), the recipient is given an option to receive a digest or summary periodically in lieu of receiving every full email messages (e.g., reply-all emails) of the email thread. In this example as shown in FIG. 8, it is assumed that client 110A is determined as an inactive participant while client 110B is determined as an active participant. Client 110A will be given an option to opt out of receiving every single full incoming email. Client 110A will be listed as a member of digest distribution list 804 for a given topic.

The full email messages are archived in a predetermined storage location, for example, as part of archive messages 820 stored in storage server 130. Dependent upon the user preference and/or an amount of activities of the email thread, a digest may be generated by digest generator 810 and delivered by email processing module 815 to the user (e.g., client 801A) periodically, such as daily, weekly, or monthly, etc. The digest includes a brief summary describing each of the emails received during the corresponding period of time. The digest further includes one or more links referencing to the predetermined storage location to allow the user to access the archived full email messages via the links. For example, if there are 100 emails of a particular email thread received by a user during a week and if the user prefers to receive a digest once a week, the user will receive one email having the digest therein instead of receiving 100 emails. As a result, a user who is inactive will not be disrupted by the unwanted emails.

Whether a user is an active or inactive participant in the email thread can be determined based on a variety of different user actions. For example, actions and inactions of a user include monitoring the topic by user (and perhaps all users collectively) the messages read (and how quickly read), responded to, not acted upon and deleted unread. Once a user's activity level falls below a predetermined threshold, according to one embodiment, the user may receive an notification informing the user of this fact and offering the user to automatically be converted to receiving a periodic (daily or weekly) digest of all future messages on this topic. The notification may further contain several options for the user to: 1) remain active where they would continue to receive emails as normal; 2) convert to digest (the default); and 3) indicate this activity is no longer of interest and they wish to be removed from the distribution list and/or no longer receive emails or digests.

If no action is taken, the user may only receive these periodic digests. The digests may contain a summary of each email (e.g., the first 200 characters of each message), without attachments, and a link to view the full content and attachments. Additionally, the digest email may contain options to revert to active mode or be removed from the topic permanently. Administrative overrides such as "never convert to digest mode" may be provided as an option.

Some mail interfaces offer a "mute" or "ignore" option. For example in Gmail™ this means that a message with the same subject goes into "all mail" but bypasses the inbox for a period of time. If a user "mute" or "ignore" a particular email or email thread, such an action can be interpreted that the user is not interested in the subject matter or topic of the email thread. One would proactively convert a mailing list or a topic within the mailing list to a digest, so the user would see them but not be repeatedly interrupted. Another option is to provide the ability to temporarily drop off a mailing list, while automatically resuming it after a cooling-off period. That is, mute all conversations rather than a specific subject. A further option is to provide the ability to mute based on specific keywords, or mute everything except messages containing specific keywords.

Figure 9:
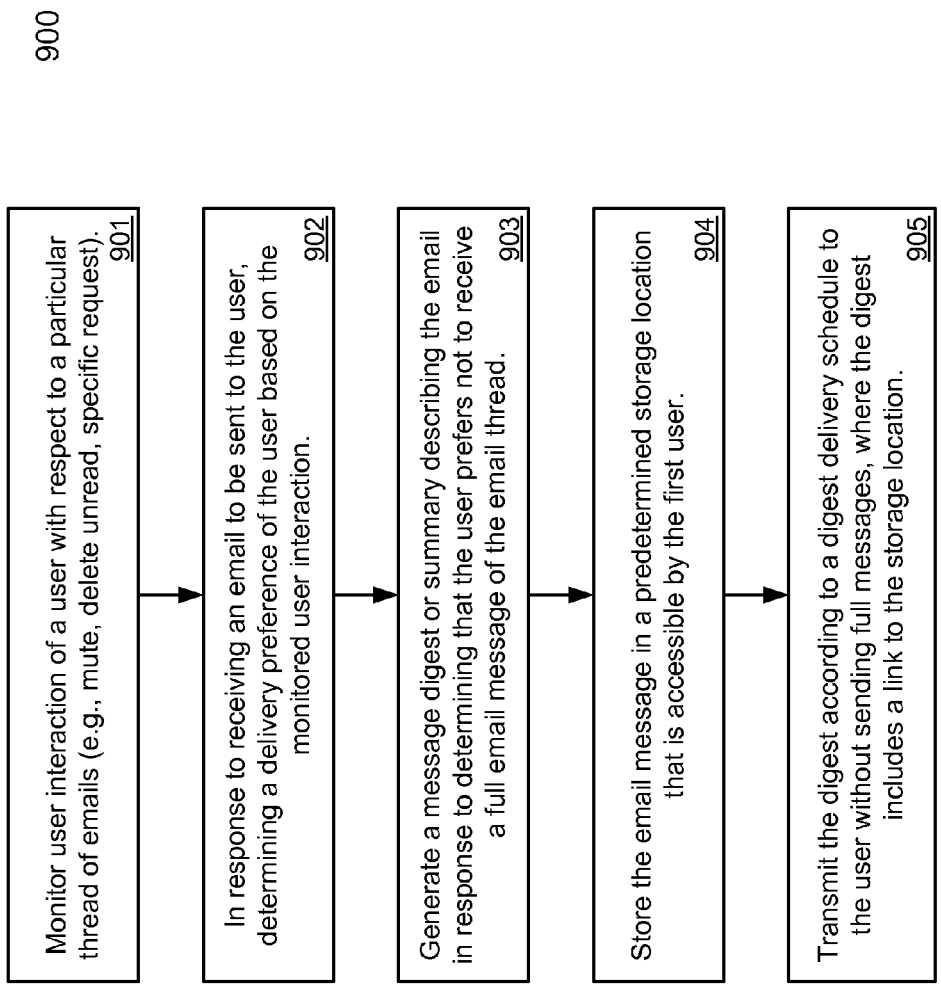
FIG. 9 is a flow diagram illustrating a method for handling large scale emails according another embodiment of the invention.

FIG. 9 is a flow diagram illustrating a method for reduce disruption to recipients from large scale emails according to one embodiment of the invention. Method 900 may be performed by email system as shown in FIG. 8. Referring to FIG. 9, at block 901, user interaction of a user with an email thread is monitored and analyzed. At block 902, in response to receiving an email to be sent to the user, processing logic determines a delivery preference of the user that is inferred based on the past user interaction with past emails in the same email thread. In response to determining that the user is considered as an inactive participant, at block 903, processing logic generates a digest or summary describing the email, and at block 905, the digest is sent to the user in lieu of the full email. The digest includes a link linking with a storage location that stores the archived full emails, where the user can access the storage location via the link of the digest.

Figure 10:
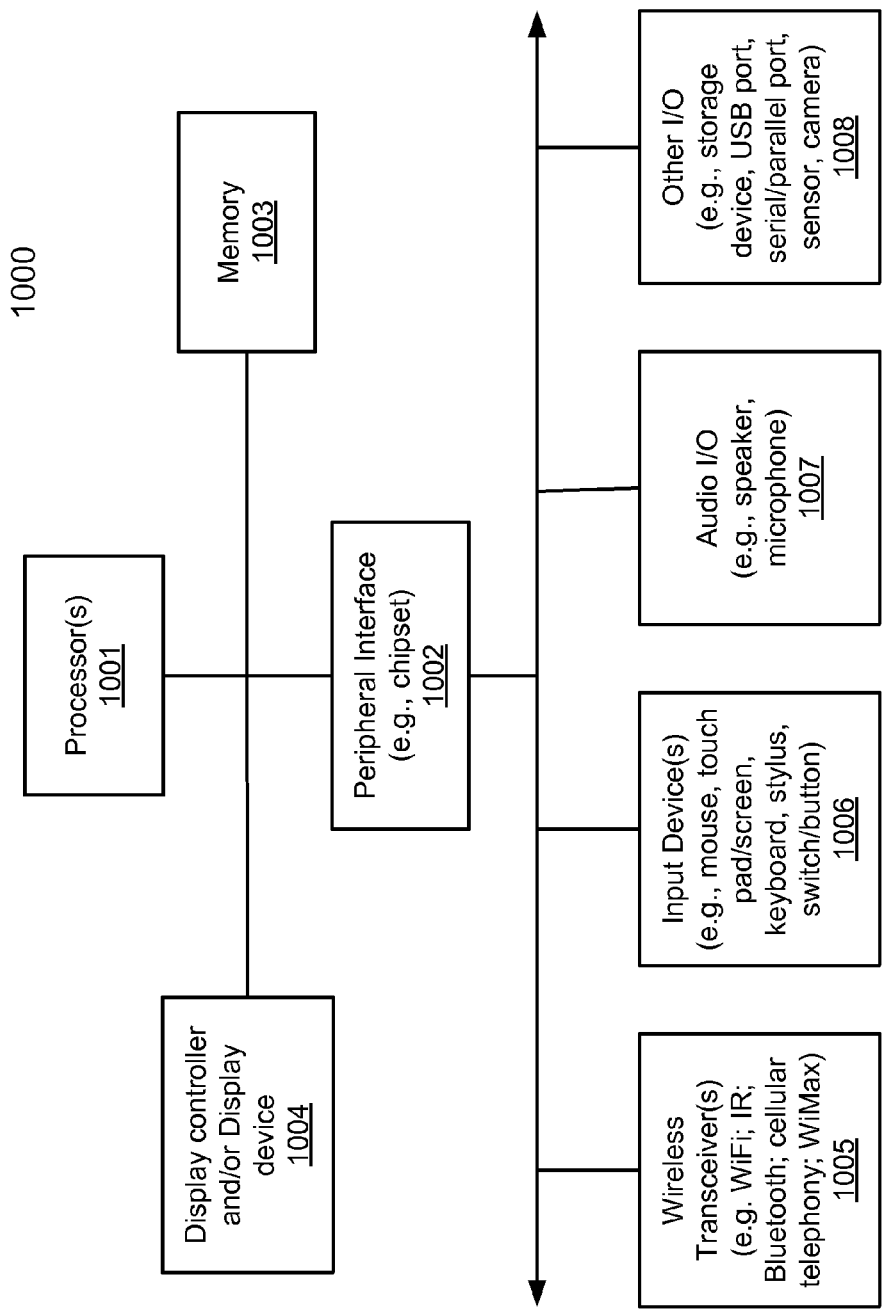
FIG. 10 is a block diagram illustrating a data processing system which may be used with an embodiment of the invention.

FIG. 10 is a block diagram illustrating an example of a data processing system which may be used with one embodiment of the invention. For example, system 1000 may represent a client machine or a server machine as described above. System 1000 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof.

Referring to FIG. 10, in one embodiment, system 1000 includes processor 1001 and peripheral interface 1002, also referred to herein as a chipset, to couple various components to processor 1001 including memory 1003 and devices 1005-1008 via a bus or an interconnect. Processor 1001 may represent a single processor or multiple processors with a single processor core or multiple processor cores included therein. Processor 1001 may represent one or more general-purpose processors such as a microprocessor, a central processing unit (CPU), or the like. More particularly, processor 1001 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1001 is configured to execute instructions for performing the operations and steps discussed herein.

Peripheral interface 1002 may include memory control hub (MCH) and input output control hub (ICH). Peripheral interface 1002 may include a memory controller (not shown) that communicates with a memory 1003. Peripheral interface 1002 may also include a graphics interface that communicates with graphics subsystem 1004, which may include a display controller and/or a display device. Peripheral interface 1002 may communicate with graphics device 1004 via an accelerated graphics port (AGP), a peripheral component interconnect (PCI) express bus, or other types of interconnects.

An MCH is sometimes referred to as a Northbridge and an ICH is sometimes referred to as a Southbridge. As used herein, the terms MCH, ICH, Northbridge and Southbridge are intended to be interpreted broadly to cover various chips who functions include passing interrupt signals toward a processor. In some embodiments, the MCH may be integrated with processor 1001. In such a configuration, peripheral interface 1002 operates as an interface chip performing some functions of the MCH and ICH. Furthermore, a graphics accelerator may be integrated within the MCH or processor 1001.

Memory 1003 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor 1001, or any other device. For example, executable code and/or data of a variety of operating systems, device drivers, firmware (e.g., input output basic system or BIOS), and/or applications can be loaded in memory 1003 and executed by processor 1001. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

Peripheral interface 1002 may provide an interface to IO devices such as devices 1005-1008, including wireless transceiver(s) 1005, input device(s) 1006, audio IO device(s) 1007, and other IO devices 1008. Wireless transceiver 1005 may be a WiFi transceiver, an infrared transceiver, a Bluetooth transceiver, a WiMax transceiver, a wireless cellular telephony transceiver, a satellite transceiver (e.g., a global positioning system (GPS) transceiver) or a combination thereof. Input device(s) 1006 may include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). For example, input device 1006 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO 1007 may include a speaker and/or a microphone to facilitate voice-enabled functions, such as voice recognition, voice replication, digital recording, and/or telephony functions. Other optional devices 1008 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor, a light sensor, a proximity sensor, etc.), or a combination thereof. Optional devices 1008 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips.

Note that while FIG. 10 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for reducing sending large scale emails, the method comprising:
   in response to a first email received from a sender to be sent to a plurality of recipients, determining a distribution cost of the first email based on content of the first email and the plurality of recipients, wherein the first email is a reply-all email in response to an earlier email of an email thread sent to the plurality of recipients;
   determining a number of reply-all emails in the email thread that were exchanged within a predetermined period of time;
   causing an email client application to present a first graphical user interface (GUI) page to the sender prompting a confirmation from the sender, the first GUI page including a size of the first email and a number of recipients, wherein the first GUI is presented when the distribution cost of the first email is above a first predetermined threshold, and when the number of reply-all emails in the email thread exceeds a second predetermined threshold;
   in response to a positive confirmation from the sender, transmitting the first email to the plurality of recipients; and
   deferring delivery of the first email for a second predetermined period of time if the number of reply-all emails exchanged within the predetermined past period of time exceeds the second predetermined threshold.

2. The method of claim 1, wherein the first GUI page comprises a modal dialog box that requires the sender to either confirm or cancel sending the first email.

3. The method of claim 1, further comprising:
   determining whether the earlier email is the latest email in the email thread in response to a send command received from the sender; and
   in response to determining that the earlier email is not the latest email, presenting a second GUI page indicating that the first email is not responsive to the latest email and requesting a confirmation from the sender.

4. The method of claim 1, further comprising:
   extracting a plurality of email addresses of the plurality of recipients from a TO field and a CC field of the first email; and
   automatically inserting the email addresses of the recipients in a BCC field of the first email prior to sending the first email.

5. The method of claim 4, further comprising inserting identifiers of the recipients in a body of the first email to indicate that the first email has been sent to the identified recipients.

6. The method of claim 1, wherein the distribution cost is determined based on at least one of a size of the first email and a number of recipients who will receive the first email.

7. The method of claim 1, wherein the first predetermined threshold is determined based on a number of emails of the email thread exchanged during a past predetermined period of time.

8. The method of claim 1, wherein determining a distribution cost is performed at the email client in response to a send command received from the sender via a user interface of the email client, and wherein in response to the positive confirmation from the sender, the first email is sent from the email client to an email server to be distributed to the recipients.

9. The method of claim 1, wherein determining a distribution cost is performed at an email server in response to the first email received from an email client associated with the sender, wherein the method further comprises:
   transmitting a request from the email server to the email client for a confirmation of the sender for sending the first email in response to determining the distribution cost of the first email is above a first predetermined threshold and the number of reply-all emails in the email thread exceeds the second predetermined threshold;
   receiving at the email server a response from the email client indicating whether the sender confirms sending the first email; and
   distributing the first email from the email server to the recipients if the response positively confirms the sender's intent to send the first email.

10. The method of claim 1, wherein the first predetermined threshold is configured based on a role of the sender within an organization.

11. A non-transitory machine-readable medium having instructions stored therein, which when executed by a processor, cause the processor to perform operations for reducing sending large scale emails, the operations comprising:
   in response to a first email received from a sender to be sent to a plurality of recipients, determining a distribution cost of the first email based on content of the first email and the plurality of recipients, wherein the first email is a reply-all email in response to an earlier email of an email thread sent to the plurality of recipients;
   determining a number of reply-all emails in the email thread that were exchanged within a predetermined period of time;

causing an email client application to present a first graphical user interface (GUI) page to the sender prompting a confirmation from the sender, the first GUI page including a size of the first email and a number of recipients, wherein the first GUI is presented when the distribution cost of the first email is above a first predetermined threshold, and when the number of reply-all emails in the mail thread exceeds a second predetermined threshold;

in response to a positive confirmation from the sender, transmitting the first email to the plurality of recipients; and deferring delivery of the first email for a second predetermined period of time if the number of reply-all emails exchanged within the predetermined past period of time exceeds the second predetermined threshold.

12. The non-transitory machine-readable medium of claim 11, wherein the first GUI page comprises a modal dialog box that requires the sender to either confirm or cancel sending the first email.

13. The non-transitory machine-readable medium of claim 11, wherein the operations further comprise:
   determining whether the earlier email is the latest email in the email thread in response to a send command received from the sender; and
   in response to determining that the earlier email is not the latest email, presenting a second GUI page indicating that the first email is not responsive to the latest email and requesting a confirmation from the sender.

14. A data processing system, comprising:
   a processor;
   a memory coupled to the processor;
   an analysis module executed from the memory by the processor, the analysis module configured to in response to a first email received from a sender to be sent to a plurality of recipients, determine a distribution cost of the first email based on content of the first email and the plurality of recipients, wherein the first email is a reply-all email in response to an earlier email of an email thread sent to the plurality of recipients, and to determine a number of reply-all emails in the email thread, and cause an email client application to present a first graphical user interface (GUI) page to the sender prompting a confirmation from the sender, the first GUI page including a size of the first email and a number of recipients, wherein the first GUI is presented when the distribution cost of the first email is above a first predetermined threshold, and when the number of reply-all emails that were exchanged within a predetermined period of time in the email thread exceeds a second predetermined threshold; and
   an email processing module executed from the memory by the processor, in response to a positive confirmation from the sender, configured to transmit the first email to the plurality of recipients and defer delivery of the first email for a second predetermined period of time if the number of reply-all emails exchanged within the predetermined past period of time exceeds the second predetermined threshold.

15. The system of claim 14, wherein the first GUI page comprises a modal dialog box that requires the sender to either confirm or cancel sending the first email.

16. The method of claim 14, wherein the analysis module is further configured to:
   determine whether the earlier email is the latest email in the email thread in response to a send command received from the sender; and
   in response to determining that the earlier email is not the latest email, cause the email client to present a second GUI page indicating that the first email is not responsive to the latest email and requesting a confirmation from the sender.

* * * * *